CHARLES C. BOOKOUT
ROBERT E. KAPTUR
INVENTORS

United States Patent Office 3,424,284
Patented Jan. 28, 1969

3,424,284
CONTROL SYSTEM FOR SEMI-AUTOMATIC
POWER TRANSMISSION MECHANISM
Charles C. Bookout, Livonia, and Robert E. Kaptur,
Birmingham, Mich., assignors to Ford Motor Company,
Dearborn, Mich., a corporation of Delaware
Filed Aug. 22, 1967, Ser. No. 662,363
U.S. Cl. 192—3.33                                    5 Claims
Int. Cl. F16d 33/12, 35/00, 37/00

ABSTRACT OF THE DISCLOSURE

This specification discloses a semi-automatic power transmission mechanism for an automotive vehicle driveline including a clutch for interrupting the torque delivery path between a hydrokinetic unit and a multiple ratio gear system. The control system for actuating the clutch includes a valve arrangement that is sensitive to the pressure in the fuel-air mixture intake manifold of the internal combustion engine used in the driveline.

Brief description of the invention

Our invention is adapted especially to be used with a hydrokinetic power transmission mechanism of the type disclosed in co-pending application Ser. No. 687,518, filed by Robert E. Kaptur on Dec. 4, 1967. That application is assigned to the assignee of this invention.

The structure of the co-pending application comprises a hydrokinetic unit situated between a multiple ratio gear system and an internal combustion engine. The hydrokinetic unit includes an impeller connected to the engine and a turbine that is adapted to be connected to the power input element of the gearing. No neutral clutch of the conventional type is required. The torque delivery path is interrupted by disconnecting the turbine from a torque input shaft extending to the gearing. This clutching function is accomplished by clutch elements situated within the shell of the hydrokinetic unit. The shell defines in part the toroidal fluid flow cavity for the bladed members of the unit.

The clutch structure is applied and released by a diaphragm spring which defines in part two semi-isolated pressure chambers. One side of the diaphragm is subjected to the pressure within the torus circuit of the hydrokinetic unit and the other side is in communication with the low pressure lubrication region of the mechanism.

The pressure differential across the diaphragm can be controlled by using an engine driven fluid pressure pump and connecting its output side either to the torus circuit or to a low pressure exhaust. A two-position pressure distributor valve selectively connects and disconnects the pump and the torus circuit. The distributor valve is actuated by a vacuum diaphragm servo having a flexible diaphragm that defines in part an engine intake manifold pressure chamber. This chamber is in communication with the engine intake manifold through a driver controlled valve that selectively interrupts and establishes communication between the manifold and the pressure chamber of the servo. The magnitude of the pressure made available to the torus circuit by the pump is regulated by a manifold pressure sensitive pressure regulator valve.

Particular description of the invention

Figure 1:
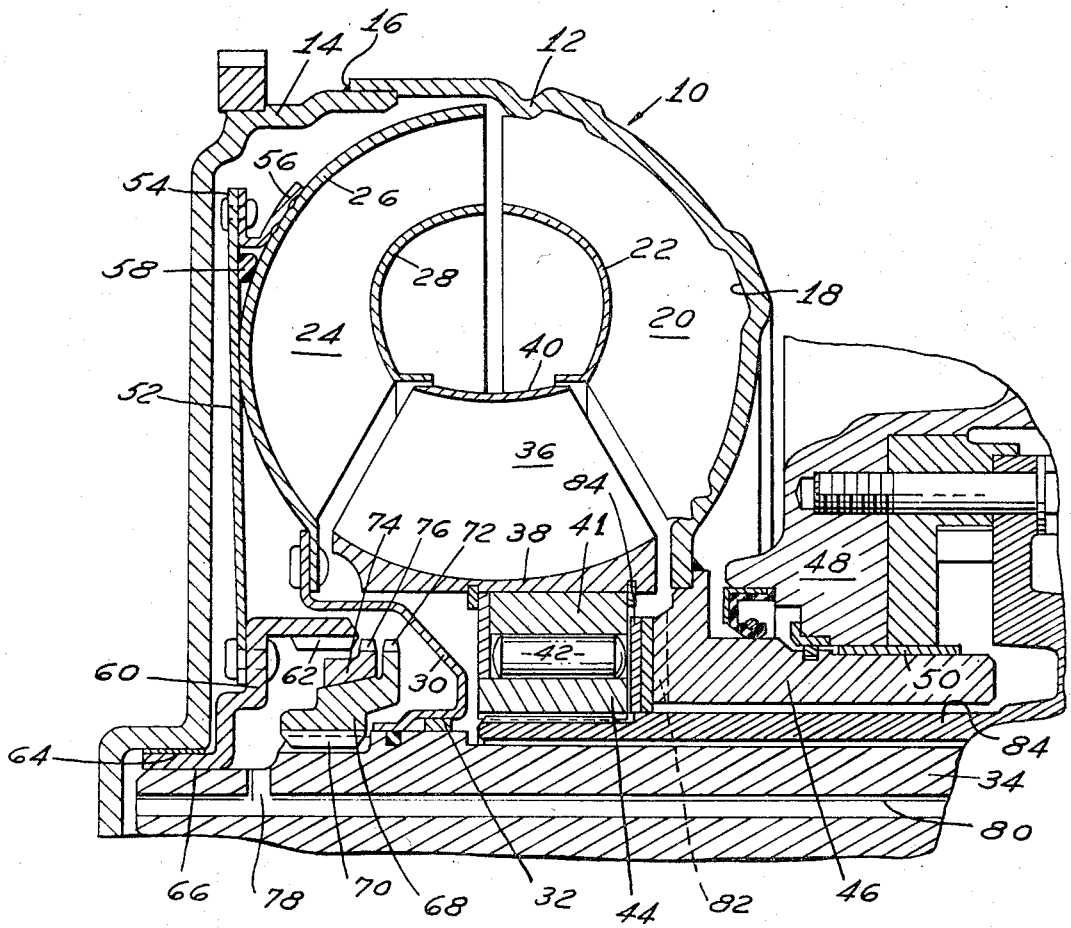
FIGURE 1 shows in longitudinal, cross-sectional form a torque converter embodying an internal, positive-engagement turbine clutch.

The hydrokinetic torque converter of FIGURE 1, which is identified generally by reference character 10, includes an impeller shell having a first shell part 12 of toroidal shape and a second shell part 14 of drum shape. The periphery of the shell part 12 is welded at 16 to the outer periphery of the shell part 14 to form a closed cavity. The inner wall 18 of the shell part 12 is indented to provide a connection with the outer margins of impeller blades 20 thereby forming a bladed impeller assembly. An inner impeller shroud 22 cooperates with the shell part 12 to define radial outflow passages.

The converter turbine, which is shown at 24, includes an outer turbine shroud 26 and an inner turbine shroud 28. Turbine blades are situated between the shrouds. The inner margin of the shroud 26 is joined to turbine hub 30 which is journaled by bushing 32 on turbine shaft 34.

Located between the flow exit section of the turbine 24 and the flow entrance section of the impeller is a bladed stator 36. Stator 36 includes a hub 38 and a shroud 40 within which are positioned flow directing blades. The hub 38, which is formed with a central opening, receives an outer race 41 for an overrunning brake having overrunning brake roller elements 42. These cooperate with cam surfaces formed in the interior of the race 41. Inner race 44 for the overrunning brake is formed by stator sleeve shaft 84 connected directly to a housing wall 48. The hub of the impeller assembly is supported by sleeve shaft 46 which is journaled at 50.

A flexible diaphragm 52, which preferably is formed of spring steel, is secured at its outer margin 54 to the turbine shroud 26. Brackets 56 welded to the shroud 26 provide a driving connection between diaphragm 52 and shroud 26. An O-ring seal is located between the outer periphery of diaphragm 52 and the shroud 26.

The inner margin of the diaphragm 52 is connected directly to a synchronizer clutch sleeve 60. This sleeve is formed with internal clutch teeth 62. It is piloted within a pilot opening 64 formed in the center of the shell part 14. The left-hand end of the turbine shaft 34 is piloted within the bearing opening 66.

A synchronizer clutch hub element 68 is splined at 70 to the shaft 34. It is formed with external clutch teeth 72 which register with internal teeth 62 to form a direct driving connection between diaphragm 52 and the shaft 34. A sychronizer ring 74 interposed between the teeth 62 and the teeth 72 is formed with external synchronizer ring teeth 76 which are engaged by teeth 62 when they are misaligned. As the teeth 62 are moved toward the teeth 72, a lost motion driving connection between ring 74 and sleeve 60 permits limited relative rotary displacement of teeth 76 with respect to teeth 62 when the motion of the sleeve 60 is out of synchronism with respect to the motion of the clutch element 68.

Ring 74 is formed with an internal friction cone surface and element 68 is formed with a cooperating external friction cone surface. As the teeth 62 apply a force in an axial direction on teeth 76, the synchronizer cone surfaces become engaged thereby tending to establish synchronism between the motion of the shaft 34 and the motion of the turbine 24.

Shifting movement of the synchronizer sleeve 60 takes place as the pressure differential across the diaphragm 52 occurs. The chamber situated between the diaphragm 52 and the shroud 26 is in fluid communication with radial passage 78 formed in shaft 34. This passage in turn communicates with an internal passage 80 which communicates with a low pressure lubrication system or a low pressure exhaust port. Fluid passes into the torus circuit through a feed passage which is defined in part by a radial groove 82 formed adjacent thrust washer 84. The flow return passage for the torus circuit is defined in part by the annular space between the stationary stator sleeve shaft 84 and turbine shaft 34.

Figure 2:
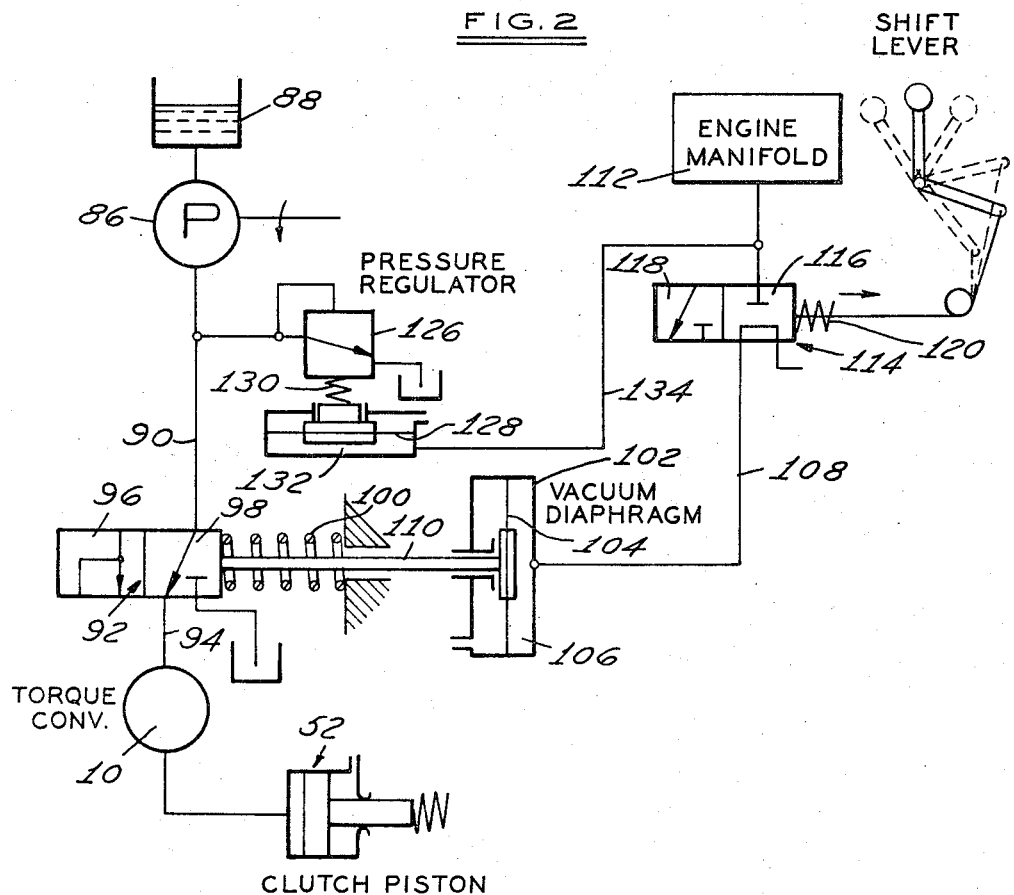
FIGURE 2 shows in schematic form a valve circuit used to control the application and release of the clutch of FIGURE 1.
Figure 3:
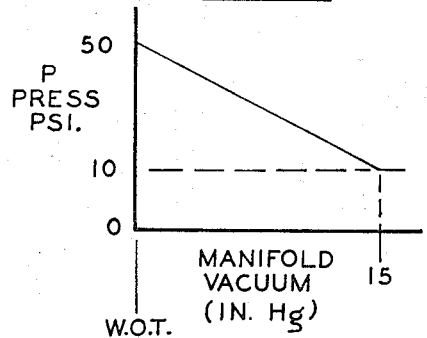
FIGURE 3 shows a chart of the relationship between the clutch engaging pressure and the engine intake manifold pressure.

In FIGURE 3 we have shown in schematic form a control system for engaging and disengaging the clutch structure of FIGURE 1. An engine driven pump 86, which may be a gear pump connected drivably to the impeller, receives fluid from a reservoir 88 and distributes it to a pressure supply passage 90. A two-position hydraulic valve 92 controls distribution of pressure from passage 90 to the intake passage 94 for the torque converter 10. Valve 92 includes a first position 96 and a second position 98. The diaphragm 52, which is schematically illustrated as a clutch piston in FIGURE 2, is in fluid communication with the torus circuit of the converter as indicated.

A valve spring 100 urges normally the valve 92 in a left-hand direction to position 98. At that time passage 90 is brought into communication with feed passage 94, and communication between passage 90 and the reservoir is interrupted. A vacuum servo for valve 92 comprises a housing 102 and a flexible diaphragm 104 which cooperates with the housing 102 to define a vacuum chamber 106. This chamber is in fluid communication with an engine manifold pressure passage 108.

The diaphragm 104 is connected mechanically to the valve 92 through a valve operating rod 110. Engine intake manifold 112 communicates with the passage 108 through a two-position pilot valve or air valve 114. When the valve 114 is in a first position 116 as shown, communication between the manifold 112 and passage 108 is interrupted. When it assumes a second position 118, communication is established between the manifold 112 and the passage 108 and communication between the atmosphere and the manifold 112 is interrupted. A spring 120 normally urges the valve 114 into position 116. A driver operated control lever 122, which may be connected through a cable system 124 to the valve 114, is used to control the position of the valve 114.

The magnitude of the pressure in passage 90 is controlled by pressure regulator valve 126. The operating pressure level maintained by the valve 126 can be varied by a pressure compensator diaphragm 128 which is adapted to increase the force of spring 130 when it deflects upwardly as viewed in FIGURE 2. The pressure chamber on the underside of the diaphragm 128, which is shown at 132, is in fluid communication with the engine intake manifold 112 through a manifold pressure passage 134. An increase in manifold pressure thus will result in an increase in regulated line pressure in passage 90. The relationship between manifold pressure and the pressure of the pump 86 established by the regulator valve 126 is shown in FIGURE 3.

If the vehicle operator desires to initiate a ratio change in the gearing that connects the transmission output shaft to the shaft 34, he may interrupt the torque delivery path by shifting the control lever 122 to a position that will cause the valve 114 to assume the position 118. If the engine carburetor throttle is relaxed at that time, the engine manifold vacuum will be greater than 15 inches of mercury. The vacuum servo can be designed so that if the amount of vacuum is equal to or greater than 15 inches of mercury, the valve 92 will be shifted to the position 96. At that instant the torus circuit will be brought into communication with the low pressure tank and the diaphragm 52 will deflect under its inherent resiliency to a position that will cause the sleeve 60 to disengage clutch element 68. When the valve 114 is shifted in the opposite direction, the vacuum servo is caused to shift the valve 98 to the position shown in FIGURE 2. At this time pump pressure in passage 90 is distributed to the hydrokinetic circuit and the diaphragm 52 then is subjected to a force unbalance that causes the clutch sleeve 60 to shift to the engaging position.

The magnitude of the clutch force is augmented when the torque delivery requirements of the driveline are increased. These increased requirements are measured by the increased manifold pressure. This same pressure is distributed through passage 134 to the regulator valve 126, the latter responding to the increased pressure signal in passage 134 to produce a higher regulated pressure in passage 90, thus producing a greater force unbalance across the diaphragm 52. The re-engagement characteristic then can be controlled to suit the torque delivery requirements of the driveline.

The vacuum diaphragm 104 is calibrated so that it will not shift the valve 92 to the position 96 until a vacuum of about 15 inches of mercury is reached. Whenever this condition is established, the clutch will be disengaged.

Having thus described a preferred form of our invention, what we claim and desire to secure by U.S. Letters Patent is:

1. In a control system for a hydrokinetic power transmission mechanism having a hydrokinetic unit with a bladed impeller and a bladed turbine situated in toroidal fluid flow relationship, said impeller including an impeller shroud that surrounds said turbine to define a hydrostatic pressure cavity, a turbine shaft, selectively engageable clutch means for connecting drivably said turbine and said turbine shaft including a first clutch element carried by said shaft and a second clutch element mounted within said cavity, each clutch element having cooperating teeth formed thereon, a diaphragm connected to said turbine and cooperating with said turbine to define a first pressure chamber that is isolated from the interior of said pressure cavity, said second clutch element being connected to said diaphragm, a fluid pressure pump, passage structure connecting said pump and said pressure cavity for supplying the latter with hydrokinetic fluid under pressure, a clutch valve means in said passage for establishing and interrupting fluid communication between said pump and said cavity, a pressure servo connected to said valve means for positioning the same, a pressure signal source, a signal passage between said signal source and said servo, and personally operable control valve means in said signal passage for selectively blocking and establishing fluid communication between said signal source and said servo whereby the pressure in said pump is made available to said cavity as said servo shifts said clutch valve means to a passage opening position in response to manual shifting movement of said personally operable valve means.

2. In a semi-automatic control system for a transmission mechanism having a hydrokinetic torque converter adapted to deliver driving torque to a driven member from an internal combustion engine having an air-fuel mixture intake manifold, said converter having an impeller shell and a bladed turbine situated within said shell, a turbine shaft in said converter extending coaxially with respect thereto, a positive engagement clutch means in said shell for connecting selectively said turbine and said turbine shaft, said clutch means comprising a first clutch element having first clutch teeth connected to said turbine shaft, a second clutch element having second clutch teeth, a diaphragm connected to said turbine and cooperating therewith to define a pressure cavity that is isolated from the torus circuit, said second clutch element being connected to said diaphragm and movable into engagement with said first clutch element upon deflection of said diaphragm in response to a pressure differential thereacross, a pump pressure source, passage structure connecting said circuit and said pump including a clutch valve means for selectively connecting said pump and said circuit and for exhausting the latter, a manifold pressure sensitive servo means connected to said valve means for adjustably positioning the latter, a signal passage means connecting said manifold and said servo, and manually controlled valve means in said signal passage means for selectively opening and blocking the same to control the operation of said servo.

3. The combination set forth in claim 2 including a spring acting on said clutch valve to bias it normally to an open passage position, said servo being subjected to the manifold pressure in said signal passage, the force of said spring opposing the pressure force of said servo, the pressure force being effective to overcome the force of said spring at a precalibrated value for said manifold pressure.

4. The combination set forth in claim 2 including regulator valve means communicating with said passage for varying the magnitude of the pump pressure made available to said circuit in response to changes in said manifold pressure, said regulator valve means communicating with said manifold.

5. The combination set forth in claim 3 including regulator valve means communicating with said passage for varying the magnitude of the pump pressure made available to said circuit in response to changes in said manifold pressure, said regulator valve means communicating with said manifold.

References Cited
UNITED STATES PATENTS

| | | | |
|---|---|---|---|
| 1,576,996 | 3/1926 | Radcliffe | 192—3.21 |
| 3,235,043 | 2/1966 | Maurice et al. | 192—3.33 |

FOREIGN PATENTS

| | | |
|---|---|---|
| 1,196,909 | 7/1965 | Germany. |

DONLEY J. STOCKING, *Primary Examiner.*

HENRY S. LAYTON, *Assistant Examiner.*

U.S. Cl. X.R.

192—3.21